United States Patent
Uppunda et al.

(10) Patent No.: US 9,385,969 B2
(45) Date of Patent: Jul. 5, 2016

(54) MERGING FIBRE CHANNEL FABRICS

(71) Applicant: Cisco Technology, Inc., San Jose, CA (US)

(72) Inventors: Kishan Kumar Kotari Uppunda, Bangalore (IN); Prabesh Babu Nanjundaiah, Tumkur (IN)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 14/016,469

(22) Filed: Sep. 3, 2013

(65) Prior Publication Data

US 2015/0063160 A1    Mar. 5, 2015

(51) Int. Cl.
| | |
|---|---|
| *H04L 12/26* | (2006.01) |
| *H04L 12/931* | (2013.01) |
| *H04L 12/24* | (2006.01) |
| *H04L 29/12* | (2006.01) |

(52) U.S. Cl.
CPC .............. *H04L 49/356* (2013.01); *H04L 41/00* (2013.01); *H04L 49/357* (2013.01); *H04L 49/70* (2013.01); *H04L 61/2038* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 7,876,707 B2 | 1/2011 | Sasso et al. | |
| 8,811,227 B2 * | 8/2014 | Sasso et al. | 370/254 |
| 8,830,871 B2 * | 9/2014 | Sasso et al. | 370/255 |
| 8,886,771 B2 * | 11/2014 | Hariharan et al. | 709/220 |
| 2004/0013092 A1 * | 1/2004 | Betker et al. | 370/254 |
| 2005/0254490 A1 * | 11/2005 | Gallatin et al. | 370/389 |
| 2009/0067430 A1 * | 3/2009 | Sasso et al. | 370/394 |
| 2011/0090804 A1 * | 4/2011 | Wusirika | 370/252 |
| 2013/0010638 A1 * | 1/2013 | Sasso et al. | 370/254 |
| 2013/0208625 A1 * | 8/2013 | Sasso et al. | 370/255 |

\* cited by examiner

*Primary Examiner* — Steven H Nguyen
(74) *Attorney, Agent, or Firm* — Edell, Shapiro & Finnan, LLC

(57) ABSTRACT

A Fiber (Fibre) Channel (FC) switch and related methods are provided for merging FC fabrics. During a merger process of two separate FC fabrics, a principal switch in a merged FC fabric allocates a domain identifier (ID) to each switch in the merged FC fabric. The principal switch is configured to build a complete domain ID list that identifies the domain IDs for all switches in the merged FC fabric. After the complete domain ID list is generated, the principal switch transmits a message to all switches in the merged FC fabric, the message including the complete domain ID list.

20 Claims, 5 Drawing Sheets

MERGING FIBRE CHANNEL FABRICS

TECHNICAL FIELD

The present disclosure relates to the merging of Fibre Channel fabrics.

BACKGROUND

The Fibre (Fiber) Channel (FC) standard addresses the general need in networking for fast transfers of large amounts of information. FC networks utilize an arrangement of switches, referred to as an FC fabric, to connect various devices (e.g., storage arrays, servers, etc.). This approach simplifies the overhead associated with network traffic, since devices with FC ports only manage a point to-point connection between those FC ports and the FC fabric.

To eliminate ambiguity when routing traffic between switches in an FC network, a multi-phase build process is performed to assign each switch one or more unique domain identifiers (IDs). In general, one switch in the FC fabric is selected as a principal switch that assigns domain IDs to the other switches of the FC fabric.

It is often desirable to merge two FC fabrics, for example, to expand a network or link network devices. When merging, the FC fabrics again go through a build process where a new principal switch is selected to assign and maintain domain IDs for all of the switches in the merged FC fabric.

DESCRIPTION OF EXAMPLE EMBODIMENTS

Overview

A Fibre (Fiber) Channel (FC) switch and related methods are provided for merging FC fabrics. During a merger process of two separate FC fabrics, a principal switch in a merged FC fabric allocates a domain identifier (ID) to each switch in the merged FC fabric. The principal switch is configured to build a complete domain ID list that identifies the domain IDs for all switches in the merged FC fabric. After the complete domain ID list is generated so as to include a domain ID for each switch in the merged fabric, the principal switch transmits a message to all switches in the merged FC fabric, the message including the complete domain ID list.

Example Embodiments

Figure 1:
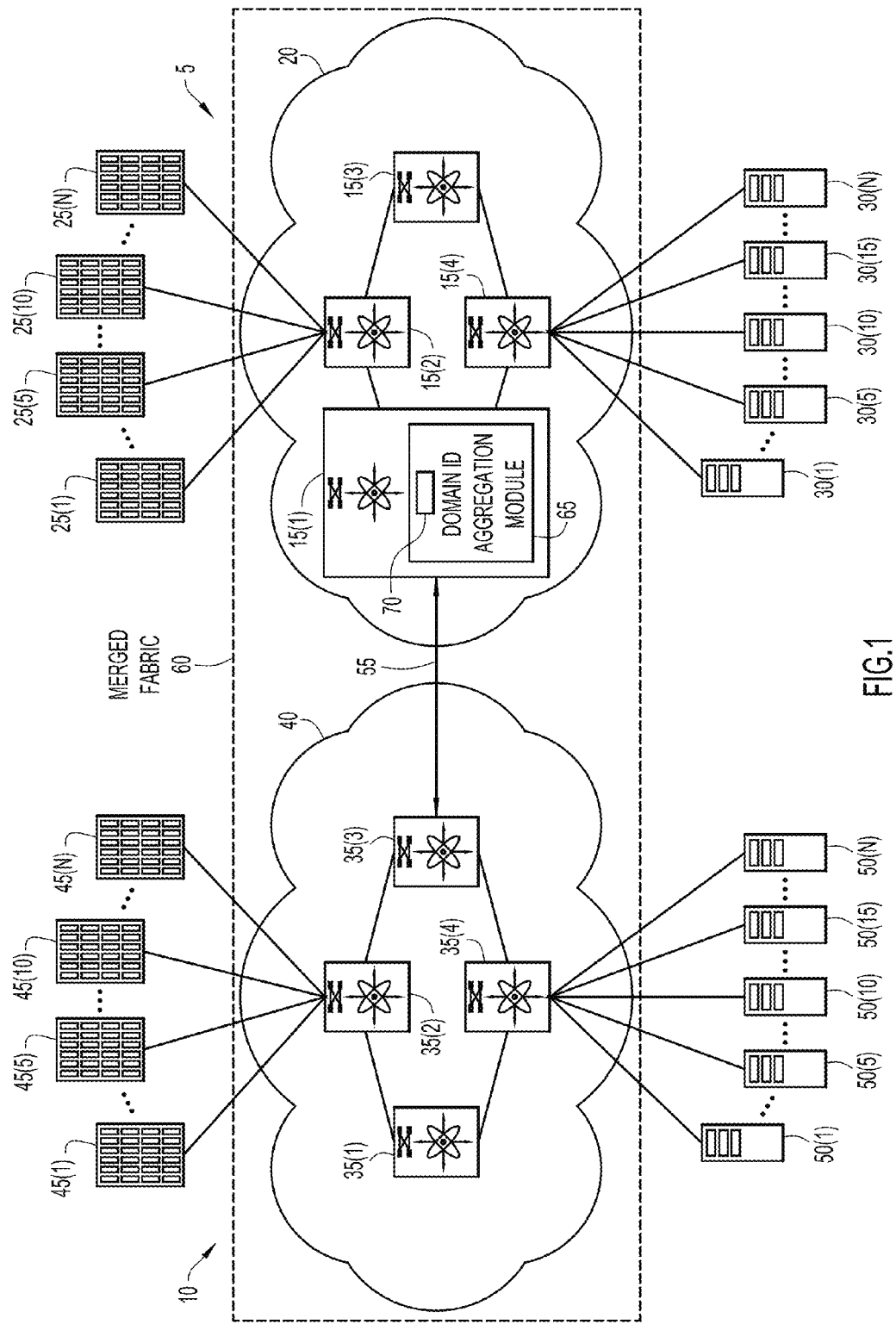
FIG. 1 is a block diagram illustrating the merger of two FC fabrics using a single flooded Exchange Fabric Parameters (EFP) frame having a complete domain ID list.

FIG. 1 illustrates an example comprising a first network 5 and a second network 10. In this example, network 5 comprises an FC fabric 20. The FC fabric 20 comprises an arrangement of interconnected FC switches 15(1)-15(4) and network connections between the switches and other elements. Network 5 further comprises storage arrays 25(1)-25(N) and host servers 30(1)-30(N). Each FC switch 15(1)-15(4) connects to other FC switches, and some edge FC switches also connect to FC devices. For example, switch 15(4) is configured to connect to servers 30(1)-30(N). Switch 15(2) connects to a plurality of FC storage arrays 25(1)-25(N) that may be in one or more different runtime domains.

Network 10 has a similar configuration to the configuration of FC network 5. More specifically, network 10 also comprises am FC fabric 40 comprising an arrangement of interconnected FC switches 35(1)-35(4) and network connections between the switches and other elements. Network 10 also comprises FC storage arrays 45(1)-45(N) and host servers 50(1)-50(N). Each FC switch 35(1)-35(4) connects to other FC switches, and some edge FC switches also connect to FC devices. For example, switch 35(4) is configured to connect to servers 50(1)-50(N). Switch 35(2) connects to a plurality of FC storage arrays 45(1)-45(N) that may also be in one or more different runtime domains.

FC fabrics 20 and 40 may be located within the same site (e.g., in a common building or campus) or at different remote sites. In any case, a link 55 between switch 15(1) and switch 35(3) may be established to connect the fabrics 20 and 40. The link 55 allows the fabrics 20 and 40 to be merged and may include any suitable combination of components. After creation of link 55, FC fabrics 20 and 40 are collectively referred to as a merged FC fabric 60.

To eliminate ambiguity when routing traffic between switches in an FC fabric, each switch within the FC fabric is assigned one or more unique domain identifiers (IDs). In general, a domain ID is an 8-bit identifier that forms part of a 24-bit FC address for a switch. When two FC fabrics merge, the FC fabrics allocate new domain IDs to each switch. In other words, the domain IDs that existed in the original two separate FC fabrics are no longer valid and the switches receive new domain IDs for use in the new (merged) network.

Generally, the FC fabric bring-up/merge protocol starts with the exchange of one or more Exchange Fabric Parameters (EFP) frames that are used by the merging networks to determine whether the merging networks are two stable fabrics, unstable fabrics, or a combination of stable and unstable fabrics. Depending upon the determined stability of the fabrics, the protocol starts with either a build fabric phase followed by a principal switch selection phase, or in the case of two stable fabrics, begins directly with the principal switch selection phase. In either case, after selection of the principal switch, a domain ID distribution phase is executed to allocate each switch in the fabric with a new unique domain ID.

In the domain ID distribution phase, the principal switch assigns domain IDs to all switches (including itself) and distributes the domain IDs through the network. In accordance with existing and proposed FC standards, a well-defined process is followed to assign and distribute the domain IDs. More specifically, after the principal switch selection in conventional arrangements, the designated principal switch allocates domain IDs to the subordinate switches in a sequential manner. When a domain ID is allocated to a switch, the principal switch floods an EFP frame (i.e., EFP Switch Inter Link Service (SW_ILS) request) to all the other switches in the FC fabric to indicate the change in the domain ID list of the fabric. This EFP frame flooding occurs after each domain ID allocation (i.e., after each switch receives a domain ID). This means that if there are "n" switches in the FC fabric, a principal switch in a conventional arrangement will issue "n" EFP frame floods during every fabric bring-up/merge. Additionally, subordinate switches would further initiate EFP frame floods to propagate the domain list update to their neighbors. For every EFP frame flood exchange on class F (which is an acknowledgement (ACK) based class of service), additional ACK messages may also be initiated. In other words, in conventional arrangements where there are "n" number of switches, there will be EFP frames flooded "n" number of times to "n−1" switches, potentially resulting in "n*(n−1)" frames in the network (excluding the ACK frames). For example, if there are 100 switches (one principal switch and 99 subordinate switches) in a fabric, the principle switch will issue 100 EFP frames that are transmitted to 99 switches. This results in the transmission of 100*(99) or n*(n−1) frames by the principal switch.

The large number of flooded EFP frames may cause network congestion since the number of frames exchanged is already high during the fabric build process and also makes the fabric controller busy, especially in larger fabrics. The flooded EFP frames also extend the time period it takes to merge FC fabrics and is one of the factors that makes it difficult to increase the number of switches in FC fabrics.

Presented herein are techniques to merge FC fabrics without flooding EFP frames after the allocation of each domain ID. Instead, a single EFP frame that includes the domain IDs allocated to all switches is flooded at the end of the domain ID distribution phase.

Referring to the example of FIG. 1, as the FC fabrics 20 and 40 merge, switch 15(1) is selected as the principal switch. As shown, switch 15(1) comprises a domain ID aggregation module 65 configured to implement the techniques presented herein. In particular, the domain ID aggregation module 65 of principal switch 15(1) allocates domain IDs to itself and to the other switches 15(2)-15(4) and 35(1)-35(4) in the merged fabric 60. However, in contrast to conventional arrangements and the FC standards, the principal switch 15(1) does not issue an EFP frame flood after each domain ID is allocated. Instead, the principal switch 15(1) floods a single EFP frame after all switches 15(1)-15(4) and 35(1)-35(4) in the merged fabric 60 receive domain IDs.

Stated differently, principal switch 15(1) allocates domain IDs to the switches 15(1)-15(4) and 35(1)-35(4) and builds a domain ID list for the merged fabric 60. At the end of the domain ID distribution phase, the domain ID list is a complete/full/consolidated domain ID list that includes the domain IDs for all switches 15(1)-15(4) and 35(1)-35(4) in the merged fabric 60. A complete domain ID list is schematically shown in FIG. 1 at reference numeral 70. Once the complete domain ID list 70 is generated, the principal switch 15(1) floods the merged fabric 60 with an EFP frame that includes the complete domain ID list 70.

Figure 2:
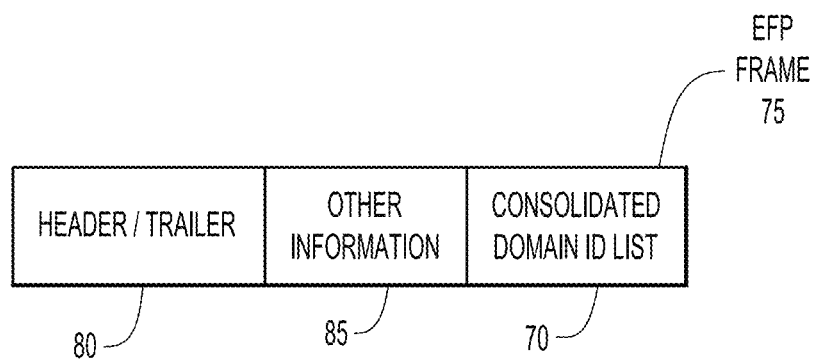
FIG. 2 illustrates an EFP frame that includes a complete domain ID list.

FIG. 2 illustrates an EFP frame 75 that includes the complete domain ID list 70, a header/trailer 80, and other information (e.g., information regarding the principal switch, etc.). The complete domain list 70 is received and stored by the other switches 15(2)-15(4) and 35(1)-35(4) in the merged fabric 60 for subsequent use.

The optimizations described herein are backward compatible since the domain IDs are not used until after the domain ID distribution phase. To be more specific, none of the fabric services (i.e., entities that utilize the switch domain IDs) are operational until after the fabric becomes stable. As such, the presented techniques do not affect the current operation of the various switches, other than the principle switch, in a merged fabric.

Figure 3:
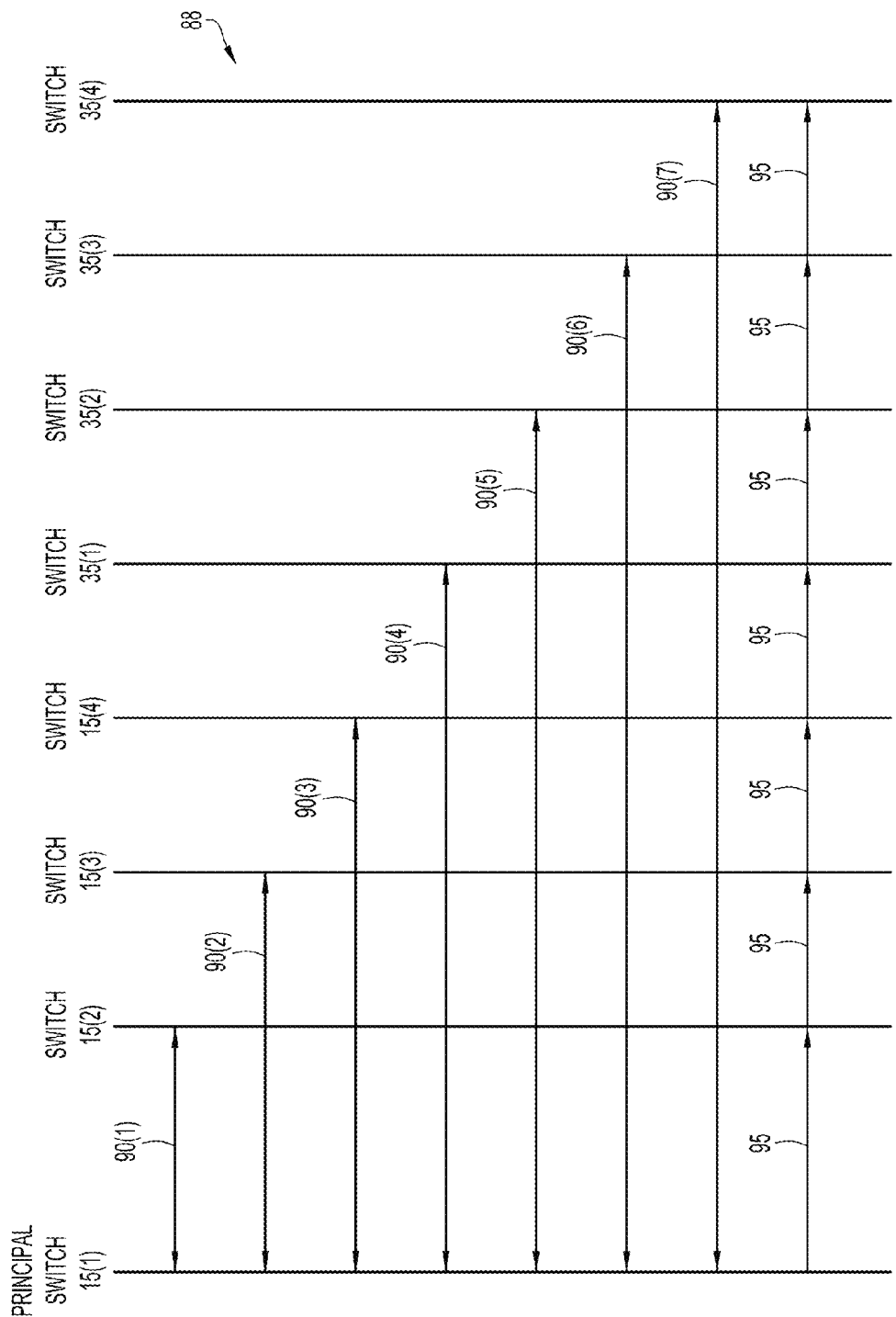
FIG. 3 is a flow diagram illustrating the exchange of messages during the merger of two FC fabrics in accordance with examples presented herein.

FIG. 3 is a ladder diagram 88 illustrating a domain ID distribution phase in accordance with examples presented herein. For ease of illustration, the ladder diagram 88 is described with reference to the arrangement of FIG. 1.

As noted above, when fabrics 20 and 40 of FIG. 1 form merged fabric 60, switch 15(1) is selected as the principal switch and has the responsibility of assigning/allocating domain IDs to itself and the other switches in the merged fabric 60 during the domain ID distribution phase. In general, the principal switch 15(1) individually communicates with each of the other switches 15(2)-15(4) and 35(1)-35(4) to allocate each switch with a domain ID. These communications between principal switch 15(1) and each of the switches 15(2), 15(3), 15(4), 35(1), 35(2), 35(3), and 35(4) are represented in FIG. 3 by arrows 90(1), 90(2), 90(3), 90(4), 90(5), 90(6), and 90(7), respectively. The domain ID communications 90(1)-90(7) may be bi-directional. For example, the principal switch 15(1) may send Domain Identifier Assigned (DIA) frames to neighbor switches. Upon receiving a DIA frame, a neighbor switch, such as switch 15(2), recognizes that the principal switch has been selected and that is time to request a domain ID. The neighbor switch 15(2) requests a domain ID by sending a Request Domain ID (RDI) frame to the principal switch 15(1). After receiving the RDI frame from switch 15(2), the principal switch 15(1) allocates a domain ID to that switch 15(2) and sends the domain ID back to the single (i.e., one) switch 15(2) that transmitted the RDI frame. The domain ID may be sent back to the switch 15(2) as part of a RDI accept (ACC) frame.

The communications 90(1)-90(7) are point-to-point communications (i.e., between principal switch 15(1) and each of the switches 15(2)-15(4) and 35(1)-35(4)) and are not flooded. Therefore, after each domain ID is allocated, the other switches in the merged fabric 60 are not aware of the allocated domain IDs. However, as explained above with reference to FIG. 1, while allocating the domain IDs, the principal switch 15(1) stores a domain ID list. At the end of the domain ID distribution phase, the principal switch 15(1) has a complete domain ID list 70 and generates an EFP frame 75 that is flooded to all of the other switches in the merged fabric 60. The flood of EFP frame 75 at the end of the domain ID distribution phase is shown in FIG. 3 by arrows 95.

Figure 4:
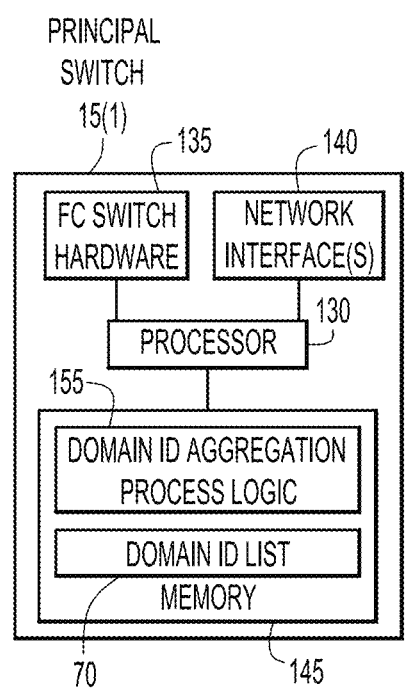
FIG. 4 is a block diagram of a principal switch configured to build a complete domain ID list and initiate a flood of a single EFP message comprising the complete domain ID list.

FIG. 4 is a block diagram illustration one implementation of principal switch 15(1) configured to perform the techniques presented herein. As shown, principal switch 15(1) comprises a processor 130, FC switch hardware 135, network interface(s) 140 and a memory 145. The memory 145 includes a domain ID list 70 and domain ID aggregation process logic 155. The domain ID list 70 comprises a list of the domain IDs that are allocated to switches 15(1)-15(4) and 35(1)-35(4) by the principal switch 15(1). At the end of a domain ID distribution phase executed by the principal switch 15(1), the domain ID list 70 includes the domain IDs for all switches in the merged fabric 60. As such, at the end of the domain ID distribution phase, the domain ID list 70 is referred to as a complete domain ID list.

The generation of the complete domain ID list 70 and the distribution (flood) of the complete domain ID list 70 (only after all switches have been allocated a domain ID) is facilitated through the execution of domain ID aggregation process logic 155 in the memory 145. Memory 145 may comprise read only memory (ROM), random access memory (RAM), magnetic disk storage media devices, optical storage media devices, flash memory devices, electrical, optical, or other physical/tangible memory storage devices. Processor 130 is, for example, a microprocessor or microcontroller that executes instructions for the domain ID aggregation process logic 155. Thus, in general, the memory 145 may comprise one or more computer readable storage media (e.g., a memory device) encoded with software comprising computer executable instructions and when the software is executed (by processor 130) it is operable to perform the operations described herein in connection with domain ID aggregation process logic 155 (i.e., the operations of domain ID aggregation module 65 of FIG. 1).

The FC switch hardware 135 comprises digital logic and other circuitry configured to perform the FC switching operations in an FC fabric. The FC switch hardware 135 may be implemented by one or more application specific integrated circuits (ASICs). The network interface(s) 140 include suitable FC interfaces, such as ports, for connection to an FC network and also to any other network for control/command functions associated with switch 15(1).

Figure 5:
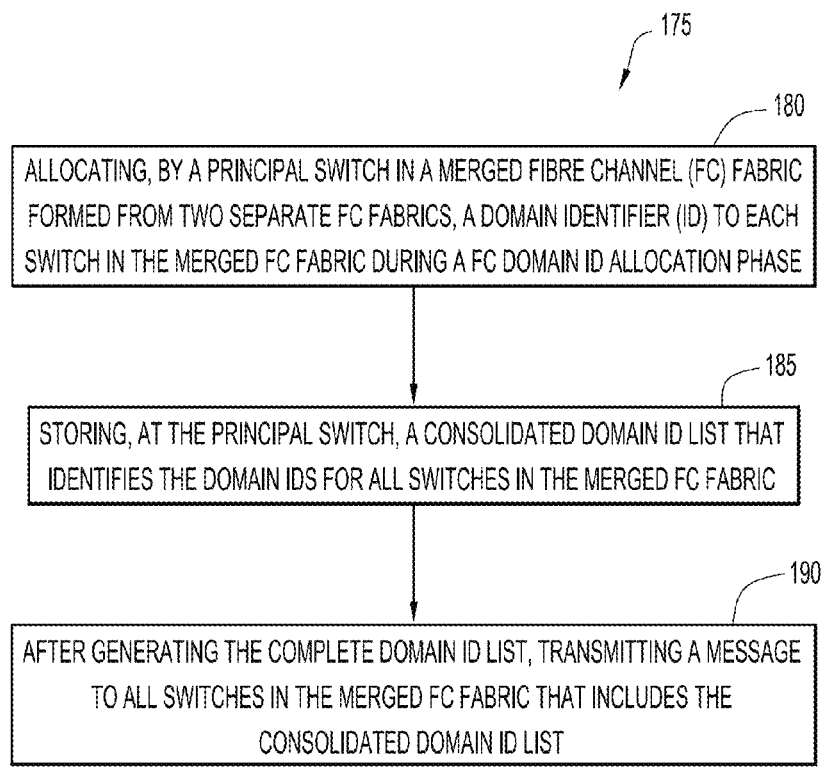
FIG. 5 is a high level flowchart illustrating example operations performed during the merger of two FC fabrics in accordance with examples presented herein.

FIG. 5 is a high level flowchart illustrating a method 175 performed during the merger of two initially separate FC fabrics to form a merged FC fabric. Method 175 begins at 180 where a principal switch in the merged FC fabric allocates a domain identifier (ID) to each switch in the merged FC fabric. At 185, the principal switch builds a complete domain ID list that identifies the domain IDs for all switches in the merged FC fabric. At 190, after storing domain IDs for each switch in the merged fabric in the complete domain ID list, the principal switch transmits a message to all switches in the merged FC fabric, the message including the complete domain ID list.

The techniques presented herein reduce the number frames that are exchanged during a fabric build process, thereby making the mergers faster and easier. In particular, one advantage of the presented techniques is that the number of EFP updates issued by a principal switch in a merged fabric is reduced from to "n*(n−1)" to "1." The techniques may be implemented in fabrics provided by different vendors (e.g., the interop or mixed fabrics) and are backwards compatible because only the principal switch supports the new capabilities and operations of the subordinate switches are not impacted. The techniques may also insulate other FC service applications from processing multiple notifications of domain updates. In general, this means that the techniques presented herein enable the size of an FC fabric to scale better than conventional arrangements.

To summarize, a method is provided comprising: allocating, by a principal switch in a merged Fibre Channel (FC) fabric formed from two separate FC fabrics, a domain identifier (ID) to each switch in the merged FC fabric during an FC domain ID allocation phase; storing, at the principal switch, a complete domain ID list that identifies the domain IDs for all switches in the merged FC fabric; and after storing domain IDs for each switch in the merged fabric in the complete domain ID list, transmitting a message to all switches in the merged FC fabric, the message including the complete domain ID list In apparatus form, an apparatus is provided comprising: a network interface unit configured to enable communications over a Fibre Channel (FC) fabric; a memory that is configured to store a complete domain identifier (ID) list that identifies the domain IDs for all switches in the merged FC fabric; and a processor coupled to the network interface unit and to the memory. The processor is configured to: allocate a domain ID to each switch in the merged FC fabric during an FC domain ID allocation phase; store the complete domain ID list that identifies the domain IDs for all switches in the merged FC fabric; and after storing domain IDs for each switch in the merged fabric in the complete domain ID list, transmit a message to all switches in the merged FC fabric, the message including the complete domain ID list.

Moreover, one or more computer readable storage media is provided, encoded with software comprising computer executable instructions and when the software is executed operable to: allocate, by a principal switch in a merged Fibre Channel (FC) fabric formed from two separate FC fabrics, a domain identifier (ID) to each switch in the merged FC fabric during an FC domain ID allocation phase; store, at the principal switch, a complete domain ID list that identifies the domain IDs for all switches in the merged FC fabric; and after storing domain IDs for each switch in the merged fabric in the complete domain ID list, transmit a message to all switches in the merged FC fabric, the message including the complete domain ID list.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   internally allocating, at a principal switch in a merged Fibre Channel (FC) fabric formed from two separate FC fabrics, a domain identifier (ID) to each switch in the merged FC fabric during an FC domain ID allocation phase;
   storing, within memory of the principal switch, the domain IDs assigned to each switch in the merged FC fabric;
   at the principal switch, prior to transmitting any Exchange Fabric Parameters (EFP) frames with domain IDs assigned to a switch in the merged FC fabric, generating a complete domain ID list that includes the domain IDs for all switches in the merged FC fabric; and
   after generating the complete domain ID list that includes the domain IDs for each switch in the merged fabric, transmitting a single message to all switches in the merged FC fabric, wherein the single message includes the complete domain ID list.

2. The method of claim 1, wherein transmitting the message that includes the complete domain ID list comprises:
   flooding a single Exchange Fabric Parameters (EFP) frame that includes the complete domain ID list to all switches in the merged FC fabric at the completion of the domain ID allocation phase.

3. The method of claim 2, wherein the single EFP frame flooded to all switches in the merged FC fabric is the only message flooded within the merged FC fabric during the domain ID allocation phase.

4. The method of claim 1, further comprising:
   prior to allocating a domain ID to all switches in the merged FC fabric, participating in a principal switch selection phase to select the principal switch for the merged FC fabric.

5. The method of claim 4, further comprising:
   sending, by the principal switch, a Domain Identifier Assigned (DIA) frame to a first switch in the merged FC fabric;
   receiving, at the principal switch, a Request Domain ID (RDI) frame from the first switch;
   allocating a domain ID to the first switch; and
   sending, by the principal switch, a RDI accept (ACC) frame back to the first switch, wherein the RDI ACC frame includes the domain ID for the first switch.

6. The method of claim 4, further comprising:
prior to participating in the principal switch selection, participating in an FC build fabric phase for the merged FC fabric.

7. The method of claim 5, further comprising:
prior to participating in the FC build fabric phase, participating in the exchange of one or more EFP frames to determine whether the merging fabrics are two stable fabrics, unstable fabrics, or a combination of stable and unstable fabrics.

8. An apparatus comprising:
a network interface unit configured to enable communications over a Fibre Channel (FC) fabric;
a memory that is configured to store a complete domain identifier (ID) list that identifies the domain IDs for all switches in the merged FC fabric; and
a processor coupled to the network interface unit and to the memory, and configured to:
internally allocate a domain ID to each switch in the merged FC fabric during an FC domain ID allocation phase;
store, within the memory, the domain IDs assigned to each switch in the merged FC fabric;
prior to transmitting any Exchange Fabric Parameters (EFP) frames with domain IDs assigned to a switch in the merged FC fabric, generate the complete domain ID list that identifies the domain IDs for all switches in the merged FC fabric; and
after generating the complete domain ID list that includes the domain IDs for each switch in the merged fabric, transmit a single message to all switches in the merged FC fabric, wherein the single message includes the complete domain ID list.

9. The apparatus of claim 8, wherein to transmit the message that includes the complete domain ID list, the processor is configured to:
flood a single Exchange Fabric Parameters (EFP) frame that includes the complete domain ID list to all switches in the merged FC fabric at the completion of the domain ID allocation phase.

10. The apparatus of claim 9, wherein the EFP frame flooded to all switches in the merged FC fabric is the only message flooded within the merged FC fabric during the domain ID allocation phase.

11. The apparatus of claim 8, wherein prior to allocating a domain ID to all switches in the merged FC fabric, the processor is configured to:
participate in a principal switch selection phase for selection as the principal switch for the merged FC fabric.

12. The apparatus of claim 11, wherein the processor is further configured to:
send a Domain Identifier Assigned (DIA) frame to a first switch in the merged FC fabric;
receive a Request Domain ID (RDI) frame from the first switch;
allocate a domain ID to the first switch; and
send a RDI accept (ACC) frame back to the first switch, wherein the RDI ACC frame includes the domain ID for the first switch.

13. The apparatus of claim 11, wherein prior to participating in the principal switch selection the processor is configured to:
participate in an FC build fabric phase for the merged FC fabric.

14. The apparatus of claim 12, wherein prior to participating in the FC build fabric phase, the processor is configured to:
participate in the exchange one or more EFP frames to determine whether the merging fabrics are two stable fabrics, unstable fabrics, or a combination of stable and unstable fabrics.

15. One or more non-transitory computer readable storage media encoded with software comprising computer executable instructions and when the software is executed operable to:
internally allocate, at a principal switch in a merged Fibre Channel (FC) fabric formed from two separate FC fabrics, a domain identifier (ID) to each switch in the merged FC fabric during an FC domain ID allocation phase;
store, within memory of the principal switch, the domain IDs assigned to each switch in the merged FC fabric;
at the principal switch, prior to transmitting any Exchange Fabric Parameters (EFP) frames with domain IDs assigned to a switch in the merged FC fabric, generate a complete domain ID list that includes the domain IDs for all switches in the merged FC fabric; and
after generating the complete domain ID list that includes the domain IDs for each switch in the merged fabric, transmit a single message to all switches in the merged FC fabric, wherein the single message includes the complete domain ID list.

16. The non-transitory computer readable storage media of claim 15, wherein the instructions operable to transmit the message that includes the complete domain ID list comprises:
flood a single Exchange Fabric Parameters (EFP) frame that includes the complete domain ID list to all switches in the merged FC fabric.

17. The non-transitory computer readable storage media of claim 16, wherein the EFP frame flooded to all switches in the merged FC fabric is the only message flooded within the merged FC fabric during the domain ID allocation phase.

18. The non-transitory computer readable storage media of claim 15, further comprising instructions operable to:
prior to allocating a domain ID to all switches in the merged FC fabric, participate in a principal switch selection phase to select the principal switch for the merged FC fabric.

19. The non-transitory computer readable storage media of claim 18, further comprising instructions operable to:
prior to participating in the principal switch selection, participate in an FC build fabric phase for the merged FC fabric.

20. The non-transitory computer readable storage media of claim 19, further comprising instructions operable to:
prior to participating in the FC build fabric phase, participate in the exchange of one or more EFP frames to determine whether the merging fabrics are two stable fabrics, unstable fabrics, or a combination of stable and unstable fabrics.

\* \* \* \* \*